United States Patent [19]

Thoma et al.

[11] Patent Number: 4,868,932
[45] Date of Patent: Sep. 26, 1989

[54] HOLDING TANK FLUSHING SYSTEM FOR A RECREATIONAL VEHICLE

[75] Inventors: Robert H. Thoma, Seattle, Wash.; J. David Swan, Bend, Oreg.

[73] Assignee: Swan Industries, Inc., Bend, Oreg.

[21] Appl. No.: 240,057

[22] Filed: Sep. 2, 1988

[51] Int. Cl.⁴ .............................................. B08B 9/08
[52] U.S. Cl. ................................. 4/323; 134/57 R; 134/169 R
[58] Field of Search .................. 4/321, 322, 323, 490; 134/57 R, 115 R, 166 R, 167 R, 168 R, 169 R; 137/240

[56] References Cited

U.S. PATENT DOCUMENTS

| | | | |
|---|---|---|---|
| 3,448,745 | 6/1969 | Seeley | 134/169 R X |
| 3,570,503 | 3/1971 | Deboliac | 134/58 |
| 3,780,757 | 12/1973 | Jordan | 134/169 R X |
| 4,059,123 | 11/1977 | Bartos et al. | 134/167 R X |
| 4,286,617 | 9/1981 | Bedient | 137/334 |
| 4,527,295 | 7/2985 | Lacore | 4/321 |
| 4,550,453 | 11/1985 | Norman | 4/323 |
| 4,667,351 | 5/1987 | Williams | 4/323 |

OTHER PUBLICATIONS

San-T-Flush TM Sales leaflet, Swan Industries.

*Primary Examiner*—Philip R. Coe
*Attorney, Agent, or Firm*—Bruce J. Ffitch

[57] ABSTRACT

A supplementary self-contained cleaning fluid distribution system provides for the selective flushing and cleaning of the waste fluid holding tanks of a recreational vehicle. From an external connection cleaning fluid is directed to grey water or sewage tanks respectively, by means of a tank selector and backflow prevention system. Components of the system include a pair of normally closed solenoid valves and a normally open pressure switch responsive to the delivered pressure of the cleaning fluid. A predetermined reduction of the cleaning fluid supply pressure automatically isolates the vehicle system from the external fluid supply.

17 Claims, 1 Drawing Sheet

HOLDING TANK FLUSHING SYSTEM FOR A RECREATIONAL VEHICLE

BACKGROUND OF THE INVENTION

The invention concerns a self-contained water system of the type commonly used in recreational vehicles and the like, and more particularly a system for controlling the internal flushing and cleaning of the waste fluid holding tanks of such a system.

Although the invention has other applications it will be assumed for convenience in the following discussion that it is installed in a recreational vehicle—a wheeled vehicle including living quarters and washing and toilet facilities and typically including two holding tanks for collecting waste fluids—a sewage tank for sewage and a so-called grey water tank for the remainder.

In conventional systems that holding tanks are connected to and drained through a tee connection accessible from outside the vehicle. A large flexible hose is connected to the tee outlet and carries the liquid waste to a receiving tank, typically underground and as provided at recreational camping grounds. Valves in the respective drain lines upstream of the tee permit selective draining of the tanks.

Holding tanks must be flushed and cleaned occasionally to maintain them and to minimize the accumulation of solids and sludge, especially in the sewage tank, and also to control odors. The volume and flow rate from the vehicle's own clean water supply storage tank is insufficient to flush these holding tanks adequately and, commonly, a garden hose is dragged into the interior of the vehicle and inserted in toilet or sink drains in an attempt to apply sufficient pressure and volume to flush and clean the holding tanks. At the same time, disinfectant or cleaning fluids may be added. But this method is at best inconvenient and easily results in damage and soiling inside the vehicle. In addition it is generally not possible to direct the flow of water from the hose onto all internal surfaces of the holding tanks so as to do an efficient cleaning and flushing job. Use of a team of two people, one inside the vehicle and one outside to control water flow and to manipulate the drain valves, reduces the risk of spillage and error but still leaves the system inefficient.

In an improved method, an auxiliary fluid line system feeds both tanks selectively from a common external inlet. This provides more convenient and effective flushing and cleaning.

It is of course necessary to avoid contamination of the pressurised water supply used for cleaning, by contact with effluent from the holding tanks during the flushing operation. Contamination might arise for example, from backflow from the flushing operation into the water supply. Or it may result from spilling in the "service area" when hoses are disconnected and siphoning may occur. If the supply system is communal or public, industry self-regulation or government regulation may require that the flushing system include particular safeguards or meet certain standards that reduce to an acceptable minimum the possibility of contamination. In some cases, the cost of required backflow prevention components may so increase the price of the optional tank flushing system as to severely limit its market.

SUMMARY OF THE INVENTION

Accordingly an object of this invention is to provide an apparatus for flushing and cleaning the interiors of holding tanks of vehicles such as recreational vehicles which is both more convenient and more effective than other known methods and which, at a feasible cost, minimizes the risk of contamination of any external cleaning fluid supply system used in a flushing operation.

An important aspect of this invention is the utilization of an auxiliary self-contained and separate fluid line system which facilitates positive and selective flushing of a holding tank through appropriately designed and placed nozzles, so that virtually all inside surfaces of the tank, grey water or sewage, can be flushed and cleaned. One or more tanks may be cleaned selectively from a single external hose connection.

Another object of the invention is to provide automatic means for prevention of backflow from the flushing system into any pressurized cleaning fluid supply system in the event of foreseeable eventualities such as a particular variation of supply pressure or flow, or a complete loss of supply pressure due to supply system failure or rupture or a loss of electrical power.

According to the invention, automatic means are provided within the flushing system so that it is operable only when connected to a supply of cleaning fluid which presents a positive pressure of the system greater than a first predetermined minimum, and which automatically interrupts fluid flow between the supply and the flushing system of the vehicle if supply pressure falls below a second predetermined positive minimum. That is to say, the flushing system of the vehicle is operable only with positive external supply pressures which fall within a predetermined range. A preferred embodiment may include an electrical interlock between a device for sensing and transducing fluid pressure and a directional control valve or valves serving the respective one or more holding tanks. Preferably the system is "fail-safe" in that, for example either loss of supply pressure or loss of electrical power will result in interrupting the fluid connection between the supply and the flushing system. The one or more tanks may be served from a single inlet to the flushing system and controls for flushing and draining may be adjacent one another for convenience in operation.

It is a feature of the invention that important components of the system serve a dual function, thus helping to reduce its total cost. Control of automatic shut-off valves selectively directs cleaning fluid to a given holding tank. The same shut-off valves may be closed automatically in response to loss of supply pressure or electrical power. By adding a component responsive to changes in supply pressure, the selective flushing control system becomes a contamination prevention system.

Another feature of the invention is that the cleaning and flushing fluids are supplied through a system of fluid lines in the vehicle completely separate from the tank drain lines. There can be no mixing or back flushing of contaminated material in the fluid supply line. Thus cleaning and flushing may be very thorough and the introduction of disinfecting and/or deodorizing fluids into the inflowing cleaning fluid can be very effective.

DESCRIPTION OF THE PREFERRED EMBODIMENT

Figure 1:
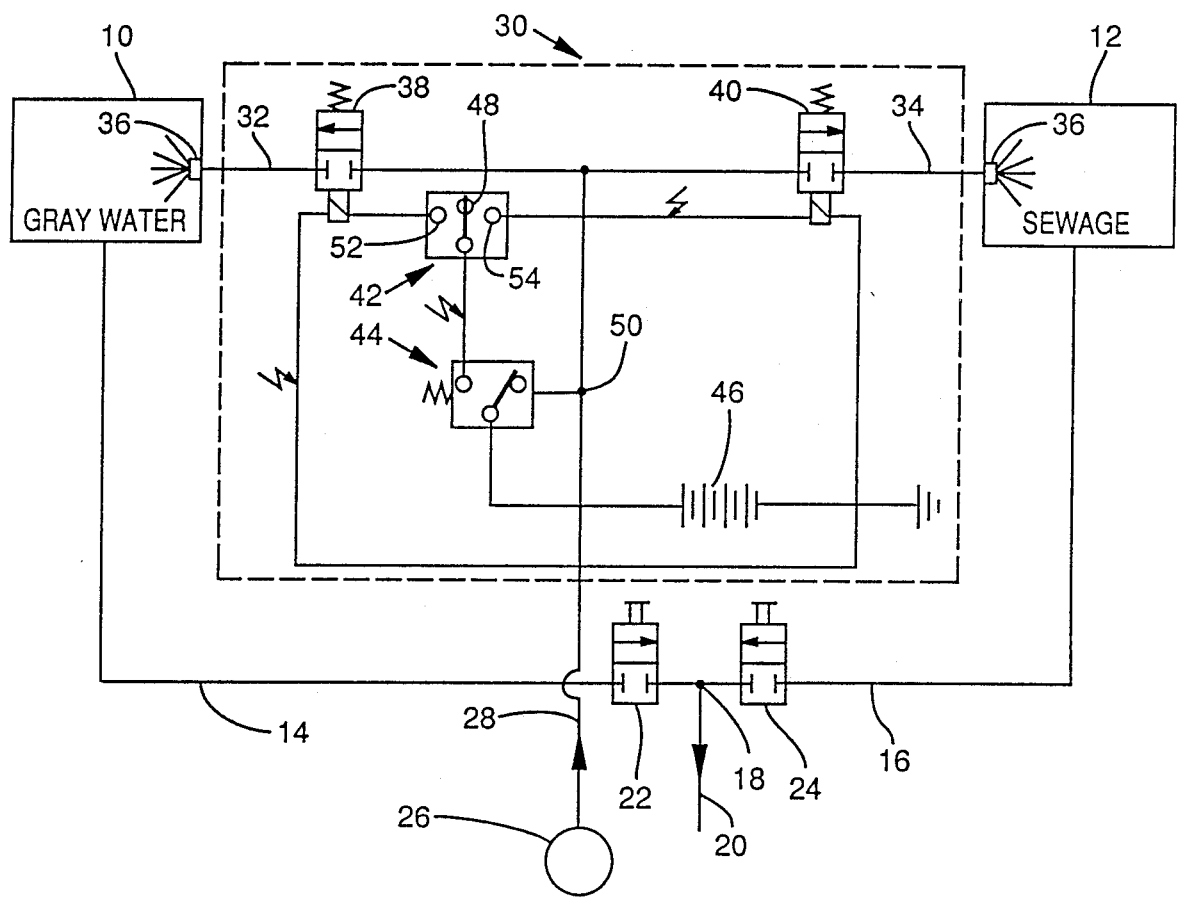
FIG. 1 is a simplified schematic of the holding tank system of the recreational vehicle including a conventional drain arrangement and a tank cleaning and flushing arrangement according to the invention.

The invention is embodied in the self-contained water system of a recreational vehicle, shown in partial simplified schematic in FIG. 1.

As indicated in the drawing of the holding tank arrangement and provisions for draining them are in some respects conventional. Typically the vehicle has a so-called grey water tank 10 and a sewage tank 12 for receiving drainage from the various plumbing fixtures (not shown) of the vehicle. The respective tanks are drained through grey water and sewage lines, 14 and 16 respectively which meet at a tee 18. The drainage tee 18 is sized to receive a typical large diameter flexible drain hose 20 for carrying the waste material into a suitable receptacle, such as an underground tank at a campground. Drainage from the individual tanks may be controlled by the respective grey water and sewage manually operated drain shut off valves 22 and 24.

Cleaning fluid is supplied from a pressurized source 26, such as a public water supply, by way of fluid line inlet portion 28. A holding tank flushing and cleaning control system 30, connected to the inlet portion 28, controls flow and distribution to the holding tanks 10, 12 through cleaning fluid lines 32, 34 respectively. Release of cleaning fluid into the tanks is by nozzle assemblies 36.

Turning now to the holding tank flushing and cleaning control system 30 (which may also be regarded as a tank selector and backflow prevention system), it includes: a pair of independently operated, normally closed solenoid valves, grey water and sewage tank valves 38, 40 respectively; a tank selector switch 42; and a pressure switch 44. The solenoids are powered by a suitable source of electrical power such as a battery 46 carried by the recreational vehicle.

The normally closed solenoid valves 38, 40 may be conventional but selected to be compatible with the flow and pressure characteristics of the system as well as with the electrical supply 46. The tank selector switch 42 may be of a single pole, double throw type, preferably with a central, neutral or off position 48. The pressure switch 44 is tapped into the flushing system inlet lines 28 by a tee 50. Suitable specifications for the switch, depending on the installation, may include being normally (electrically) open but responsive to rising fluid pressures in the inlet line 28 so as to close at 35 to 50 psi and open, on pressure drop, at 15 to 30 psi. However, preferably both "on" and "off" pressures are adjustable to suit particular applications. A suitable differential pressure range for many applications, between "off" and "on", may be 15 to 20 psi.

Controls and cleaning fluid connections for the system are preferably grouped together at an outside wall of the recreational vehicle and accessible from outside the vehicle. A conventional quick disconnect fitting (not shown) is convenient for connecting a hose for bringing a supply of cleaning fluid such as water under pressure to service the system. Convenience is enhanced if the flushing and cleaning system controls, including tank selector switch 42, the connector of the inlet line 28 and the tank drainage tee 18, along with drainage control valves 22, 24, are all in the same general vicinity adjacent at outside wall of the recreational vehicle.

In typical operation, the fluid line inlet portion 28 is connected to the pressurized cleaning fluid source 26 by a hose (not shown). Usually the holding tanks 10, 12 will already have been preliminarily drained. Tanks may be flushed and cleaned with the tank drain valves 22, 24 open or closed.

Both tank feed lines, grey water tank feed line 32 and sewage tank fed line 34, are normally closed by the solenoid valves 38, 40 and flushing operation is possible only when the external cleaning fluid delivered pressure (as sensed by the pressure switch 44) is above a threshold pressure, as determined by the "on" pressure of the pressure switch. Typically, as suggested above, a suitable "on" pressure is in the range of 35 to 50 psi. Only then is the pressure switch 44 closed and only then is it possible, by means of tank selector switch 42, to select one or another of the tanks by moving to one of the switch "on" positions 52, 54, so as to complete the electrical circuit and power and open one of the tank solenoid valves 38, 40.

When, for any reason, the sensed delivered pressure of the cleaning fluid falls below the "open" or "off" set point of the pressure switch 44 (suggested range 15 to 30 psi), the switch opens and electrical power to the selected solenoid valve is interrupted and the valve immediately closes.

An important function of the tank selector and backflow prevention system 30 is to provide a very reliable and high degrees of protection against the possibility of contaminated fluids resulting from the tank flushing operation (or present in the tanks in any other way), from flowing in a reverse direction in the fluid lines 32 or 34 and 28 so as to reach and contaminate the cleaning fluid source 26. Alternatively, if the tank flushing system is already disconnected from the cleaning fluid supply, the system guards against such backflow which may result in equally unacceptable environmental contamination. In backflow prevention systems which rely for their actuation on backflow actually commencing or, at least on complete loss of pressure in the cleaning fluid supply line, there is only a small safety margin. In contrast, a system according to the present invention requires a considerable positive supply pressure before the lines to the holding tanks are effectively opened, and a second lower, but still considerable positive supply pressure to hold them open. This lower pressure (below which the solenoid valves 38, 40 close to isolate the fluid supply 26 from the flushing system) is very unlikely to be exceeded by any unintentional pressure build up in the holding tanks. Thus the flushing system is signaled to shut down with a considerable pressure safety margin. The infinite time required for the actual decay of pressure in the inlet line 28 provides time for whichever of the solenoid valves 38, 40 is open to close completely before any incipient reverse flow condition can develop. Rapid closing (as well as positively closing) solenoid valves such as those used here help to maintain the safety margin provided.

It may be noted that a drop of system back pressure caused, for example, by a tank spray nozzle 36 becoming disconnected or some other rupture of the fluid lines downstream of the pressure switch 44, may lower the pressure at the pressure switch sufficient to shut down the system. Upon which, the inlet or upstream pressure would immediately rise, signalling the solenoid valve to reopen. Again, the line pressure would fall and the valve would close. This oscillation or cycling, visually and audibly perceptible, would usefully indicate a fault in the system.

It may also be noted that, preferably, nozzles 36 are mounted in a tank wall elevated above the tank floor. Thus there is normally an effective "air gap" between the cleaning fluid delivery point and any objectionable material which may be in the tank. This provides an additional margin of safety. Direct contamination of the supply 26 by backflow in the fluid lines 32, 34 could occur only if tank contents enter the lines at one of the nozzle outlets 36.

Enhancement of the system is provided by the three position tank selector switch 42. Not only may an operator select at will the tank to be flushed, but also by setting the switch to neutral or off position 48, he may, after connecting the pressurized cleaning fluid supply 26, control the commencement and sequence of flushing and draining operations to suit his convenience.

A holding tank flushing and cleaning system according to the invention is simple and convenient to operate. A single hose connection at inlet 28 services both holding tanks. By use of the tank selector switch 48 fluid may be directed to either tank at will from a convenient control location such as outside the recreational vehicle. One person, unaided, may conveniently perform any desired sequence of flushing and draining of the tanks. And protection against contamination of the cleaning fluid supply 26 is provided by the combination of pressure switch 44 with solenoid valves 38, 40 which function both as safety shut-off valves and as flow controllers in the selective tank flushing operation. The dual role of these components potentially reduces the total cost of the system compared with systems in which function-specific components are used.

It is to be understood that the form of our invention shown herein and described above is to be taken only as a preferred example, and that various changes such as in the shape, size and arrangement and presence or absence of parts may be resorted to without departing from the spirit of the invention or the scope of the claims.

Having thus described our invention, We claim:

1. In a recreational vehicle having a self contained plumbing system including at least one tank for holding waste fluids, said tank having walls including side walls and a floor and a drain outlet, a cleaning system for the at least one tank, connectable with a source of cleaning fluid, the cleaning fluid normally having a given positive pressure at said source and the cleaning system comprising:
    a tank inlet disposed for delivering cleaning fluid internally of said tank;
    a fluid line for conducting fluid in a downstream direction to the tank, the line having an outlet connected to the tank inlet and an upstream inlet, said upstream inlet being connectable with the source of cleaning fluid; and
    means associated with the fluid line for automatically controlling the flow of fluid between the fluid line inlet and outlet, said means normally preventing flow but responsive to fluid pressure upstream of said means so that, at a pressure equal to or exceeding a first positive pressure, downstream flow is permitted in the fluid line and so that, at pressures equal to or lower than a second positive pressure, said second pressure being lower than the first, flow is automatically interrupted.

2. The cleaning system of claim 1 wherein the first positive pressure is less than the given pressure of the fluid source.

3. The cleaning system of claim 1 wherein the means for controlling flow includes an electrically operated normally closed valve and a normally open pressure switch, the switch communicating with the fluid line so as to be responsive to pressure in the fluid line, so as to close at or above the first positive pressure, the normally closed valve and the pressure switch being electrically interconnected so that the normally closed valve is openable only when the pressure of the cleaning fluid source is equal to or exceeds the first positive pressure.

4. The cleaning system of claim 3 wherein the pressure switch is disposed so as to be responsive to pressure in the fluid line upstream of the normally closed valve.

5. In a recreational vehicle having a self contained plumbing system including first and second holding tanks for receiving and holding waste fluids from the vehicle, each tank having a plurality of walls including side walls and a floor, and a drain outlet, a tank flushing system connectable with a source of cleaning fluid normally deliverable to the vehicle at a given positive pressure, comprising:
    a tank inlet associated with each tank and disposed so as to deliver cleaning fluid internally of said tanks;
    a fluid line system including first and second fluid lines each having an outlet connected with one of said tank inlets at said respective tanks and a common fluid line inlet connectable to the source of cleaning fluid;
    normally closed valve means included in the fluid line system and operable to control flow in the first and second lines; and
    means for sensing the fluid supply pressure, operably connected to the valve means so that the valve means may be opened only when the supply pressure exceeds a predetermined positive minimum.

6. The tank flushing system of claim 5 wherein the means for sensing fluid supply pressure is disposed so as to sense said pressure in the fluid line system upstream of the normally closed valve means.

7. The tank flushing system of claim 5 wherein the means for sensing fluid supply pressure comprises a normally open electrical pressure switch.

8. The tank flushing system of claim 5 wherein the normally closed valve means comprises first and second electric solenoid valves disposed to control flow in the first and second fluid lines respectively.

9. The tank flushing system of claim 5 wherein the normally closed valve means includes a selector for selectively making the first and second fluid lines openable to fluid flow.

10. The tank flushing system of claim 9 wherein the selector is an electric switch selectively operable to prepare the first and second fluid lines for opening.

11. The tank flushing system of claim 10 wherein the selector switch includes an actuator having three positions, including first and second positions for selecting first and second fluid lines respectively, and a third position for rendering the valve means inoperable 12. In a vehicle having a self contained plumbing system including means for handling and holding waste fluids and connectable with a source of cleaning fluid, said cleaning fluid being normally deliverable from the source at a given positive pressure, a control arrangement for controlling flow of fluids between said plumbing system and the source comprising:

automatic valve means included in the plumbing system and responsive to the pressure of the delivered cleaning fluid so as to permit flow of the cleaning fluid into the plumbing system only when the pressure of the delivered cleaning fluid equals or exceeds a first predetermined minimum.

13. The control arrangement of claim 12 and including means responsive to the pressure of the cleaning fluid so as to interrupt the flow of the fluid if said pressure falls below a second predetermined minimum.

14. The control arrangement of claim 12 wherein the automatic valve means includes at least one shutoff valve and a pressure sensing means independent of the at least one shutoff valve.

15. In a vehicle having a self contained plumbing system including means for handling and holding waste fluids and connectable with a source of cleaning fluid, said cleaning fluid being normally deliverable from the source at a given positive pressure, a control arrangement for controlling the flow of fluids between said plumbing system and the source comprising:

automatic valve means included in the plumbing system and responsive to the pressure of the delivered cleaning fluid so as to interrupt flow of cleaning fluid into the plumbing system when the pressure of the delivered cleaning fluid falls below a first predetermined minimum.

16. The control arrangement of claim 15 and including means responsive to the pressure of the delivered cleaning fluid so as to permit flow of the cleaning fluid into the plumbing system only when the pressure of the delivered fluid exceeds a second predetermined minimum.

17. The control arrangement of claim 15 wherein the automatic valve means includes at least one shutoff valve and a pressure sensing means independent of the at least one shutoff valve.

* * * * *